United States Patent [19]
Gorbell et al.

[11] Patent Number: 5,486,430
[45] Date of Patent: Jan. 23, 1996

[54] INTERNAL FLUID MANIFOLD ASSEMBLY FOR AN ELECTROCHEMICAL FUEL CELL STACK ARRAY

[75] Inventors: Brian N. Gorbell, North Vancouver; Beguslav M. Wozniczka, Coquitloun; Clarence Y. Chow, Vancouver, all of Canada

[73] Assignee: Ballard Power Systems Inc., North Vancouver, Canada

[21] Appl. No.: 299,536

[22] Filed: Sep. 1, 1994

[51] Int. Cl.$^6$ .................................................. H01M 8/04
[52] U.S. Cl. .............................................. 429/35; 429/39
[58] Field of Search ............................... 429/34, 35, 37, 429/38, 39, 26

[56] References Cited

U.S. PATENT DOCUMENTS

| | | | |
|---|---|---|---|
| 4,212,929 | 7/1980 | Grevstad et al. | 429/37 |
| 4,714,661 | 12/1987 | Kaun et al. | 429/14 |
| 4,849,308 | 7/1989 | Schmitten et al. | 429/37 |
| 5,045,413 | 9/1991 | Leonard et al. | 429/13 |
| 5,230,966 | 7/1993 | Voss et al. | 429/26 |
| 5,238,754 | 8/1993 | Yasuo et al. | 429/30 |

*Primary Examiner*—Anthony Skapars
*Attorney, Agent, or Firm*—McAndrews, Held & Malloy, Ltd.

[57] ABSTRACT

A fluid manifold assembly for an array of electrochemical fuel cell stacks has a substantially fluid impermeable housing. Inlet passages are formed within the housing for introducing at least one inlet fluid stream to each of the fuel cell stacks. Outlet passages are formed within the housing for exhausting at least one outlet fluid stream from each of the fuel cell stacks.

10 Claims, 8 Drawing Sheets

INTERNAL FLUID MANIFOLD ASSEMBLY FOR AN ELECTROCHEMICAL FUEL CELL STACK ARRAY

FIELD OF THE INVENTION

The present invention relates to electrochemical fuel cells. More particularly, the present invention relates to a fluid manifold assembly for an array of fuel cell stacks which also provides the end plates for the individual fuel cell stacks.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product. The anode and cathode reactions in hydrogen/oxygen fuel cells are shown in the following equations:

Anode reaction:  $H_2 \rightarrow 2H^+ + 2e^-$

Cathode reaction:  $\tfrac{1}{2}O_2 + 2H^+ + 2e^- \rightarrow H_2O$

In typical fuel cells, the MEA is disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given plate serves as an anode plate for one cell and the other side of the plate can serve as the cathode plate for the adjacent cell. Such a series connected multiple fuel cell arrangement is referred to as a fuel cell stack, and is usually held together in its assembled state by tie rods and end plates. The stack typically includes manifolds and inlet ports for directing the fuel (substantially pure hydrogen, methanol reformate or natural gas reformate) and the oxidant (substantially pure oxygen or oxygen-containing air) to the anode and cathode flow field channels. The stack also usually includes a manifold and inlet port for directing the coolant fluid, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for the coolant water exiting the stack.

Two or more fuel cell stacks can be electrically connected, generally in series but also in parallel, to increase the overall power output of the system. Such a series connected multiple fuel cell stack arrangement is referred to as a fuel cell stack array.

In conventional fuel cell stack arrays, the inlet fuel (substantially pure hydrogen, methanol reformate or natural gas reformate), oxidant (substantially pure oxygen or oxygen-containing air), and coolant streams are generally provided to the individual fuel cell stacks by separate, external inlet conduits, each of which serves a single stack. Similarly, the outlet fuel, oxidant and coolant streams are generally exhausted from the stacks by separate, external outlet conduits, each serving a single stack. Conventional arrays therefore typically have a complex network of reactant and coolant feed and exhaust conduits associated with them. Such a complex network of conduits makes servicing the individual stacks difficult in that each conduit must be separately identified, disconnected from the corresponding inlet or outlet port, and then reconnected upon the completion of servicing. A complex network of separate, external feed and exhaust conduits must also be afforded a significant amount of volume, not only because of the overall space occupied by conduits, but also because of the space required to access and manipulate the conduits and their corresponding inlet and outlet ports during servicing.

Accordingly, it is an object of the invention to provide a fluid manifold assembly for a fuel cell stack array which reduces the number and complexity of components for delivering the inlet reactant and coolant streams to the stacks and for exhausting the outlet reactant and coolant streams from the stacks.

It is also an object of the present invention to provide a fluid manifold assembly for a fuel cell stack array which improves the volumetric efficiency of the array.

SUMMARY OF THE INVENTION

The above and other objects are achieved by a fluid manifold assembly for an array comprising a plurality of electrochemical fuel cell stacks. The fluid manifold assembly comprises:

(a) a substantially fluid impermeable housing;

(b) means for introducing at least one inlet fluid stream to each of the fuel cell stacks;

(c) means for exhausting at least one outlet fluid stream from each of the fuel cell stacks.

In the preferred fluid manifold assembly, the introducing means comprises at least one inlet passage formed within the housing. Each of the at least one inlet passage contains one of the at least one inlet fluid stream within the housing. The exhausting means preferably comprises at least one outlet passage formed within the housing. Each of the at least one outlet passage contains one of the at least one outlet fluid stream within the housing.

In the preferred fluid manifold assembly, the at least one inlet fluid stream comprises an inlet fuel stream and an inlet oxidant stream, the introducing means comprises two inlet passages, each of said two inlet passages contains one of the inlet fuel stream and the inlet oxidant stream, the at least one outlet fluid stream comprises an outlet fuel stream and an outlet oxidant stream, and the exhausting means comprises two outlet passages, each of said two outlet passages contains one of said outlet fuel stream and said outlet oxidant stream.

In the preferred fluid manifold assembly, the at least one inlet fluid stream further comprises an inlet coolant stream, the introducing means further comprises a third inlet passage, the third inlet passage contains the inlet coolant stream, the at least one outlet fluid stream further comprises an outlet coolant stream, and the exhausting means comprises a third outlet passage contains the outlet coolant stream.

The housing of the preferred fluid manifold assembly preferably comprises a plurality of plates, each of the plates attached to one of the plurality of fuel cell stacks. Each of the plates is preferably an end plate against which one of the plurality of fuel cell stacks is compressed.

At the junction of each adjacent pair of plates, each of the at least one inlet passage and the at least one outlet passage is substantially surrounded by a sealing gasket. Alternatively, each of the at least one inlet passage and the at least one outlet passage has a connecting tube disposed therein which mates with the corresponding passage in the adjacent plate. The connecting tube preferably has at least one resilient sealing ring disposed on the outer surface thereof, the at least one resilient sealing ring forming a substantially fluid impermeable seal between the connecting tube and the plate. When the plates are assembled, the interconnected passages form the fluid manifolds which extend through the assembly.

In the preferred fluid manifold assembly, each of the plurality of plates has a tongue portion extending from one edge and a cooperating groove portion formed therein along the oppositely facing edge such that the tongue portion of each plate interlocks with the groove portion of an adjacent plate.

DETAILED DESCRIPTION OF THE PREFERRED EMBODIMENTS

Figure 1:
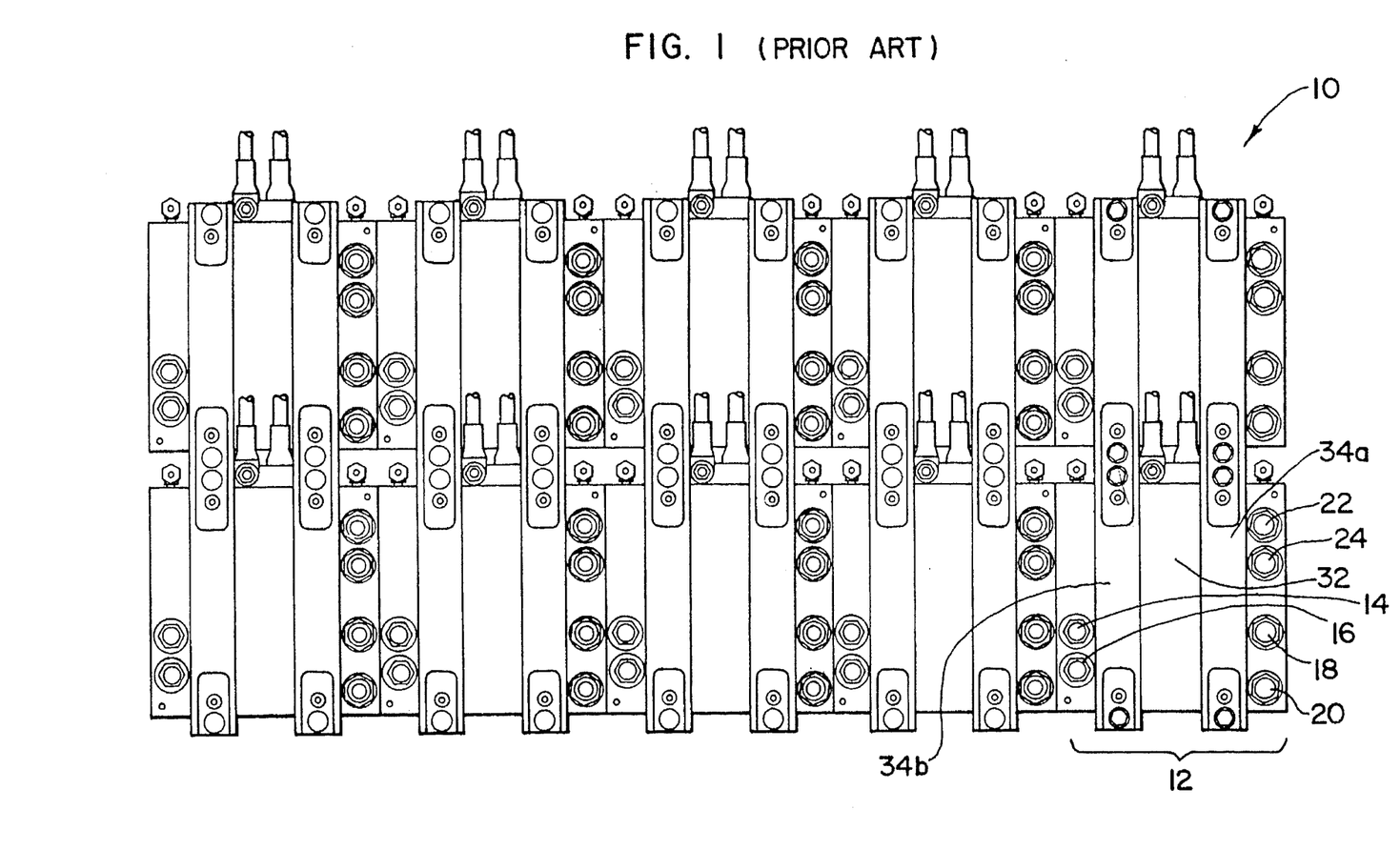
FIG. 1 is an end elevation view of two conventional tiered arrays of fuel cell stacks showing the multiplicity of ports to which the separate, external inlet and outlet conduits are connected.

Turning first to FIG. 1, a fuel cell based power generation system 10 comprises two conventional, prior art tiered arrays of five fuel cell stacks per array, for a total of ten stacks. Representative stack 12 in FIG. 1 has six ports which connect to fluid inlet and outlet conduits (not shown in FIG. 1). The six ports include inlet fuel stream port 14, outlet fuel stream port 16, inlet oxidant stream port 18, outlet oxidant stream port 20, inlet coolant stream port 22, and outlet coolant stream port 24. The plates and layers which make up stack 12 are compressed together by means of compression bars 34a, 34b, which apply compressive force against end plate 32.

Figure 2:
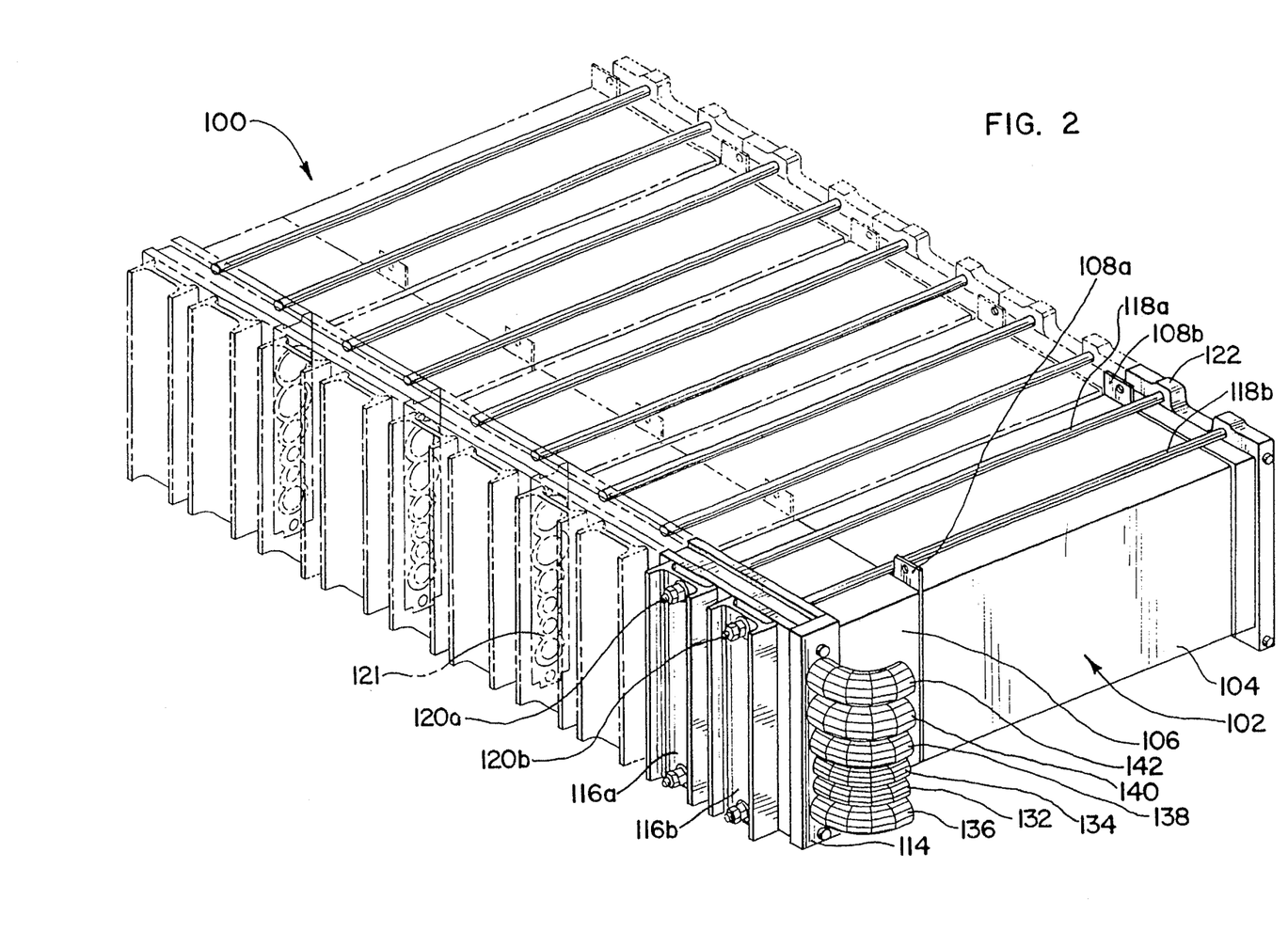
FIG. 2 is a perspective view of an internal fluid manifold assembly for an array of five electrochemical fuel cell stacks.

Turning now to FIG. 2, an array 100 of five electrochemical fuel cell stacks, one stack of which is designated in FIG. 2 as stack 102, includes an internal fluid manifold assembly, one component of which is fluid manifold end plate 114. Fuel cell stack 102 comprises an electrochemically active section 104, a humidification section 106, bus plates 108a, 108b. As shown in FIG. 1, fluidly connected to fluid manifold end plate 114 are inlet fuel conduit 132, outlet fuel conduit 134, inlet oxidant conduit 136, outlet oxidant conduit 138, inlet coolant conduit 140, and outlet coolant conduit 142.

Fuel cell stack 102 is consolidated in its compressed state by means of a compression mechanism which includes compression bars 116a, 116b, tie rods 118a, 118b, fastening nuts 120a, 120b, and compression end plate 122. Rotation of fastening nuts 120a, 120b along tie rods 118a, 118b toward the interior of stack 102 urges compression bars 116a, 116b against fluid manifold end plate 114 and toward compression end plate 122, thereby compressing the plates and layers interposed between fluid manifold end plate 114 and compression end plate 122.

Sealing gaskets, one of which is designated in FIG. 2 as gasket 121, are disposed at the junction of adjacent fluid manifold end plates. Gasket 121 substantially surrounds each of the inlet and outlet passages within the fluid manifold end plates, so as to prevent the fluid streams which flow within the passages from communicating with the environment surrounding the array 100. Gasket 121 is preferably formed from a suitable sealing material such as, for example, a resilient synthetic rubber or silicon-based material.

Figure 3:
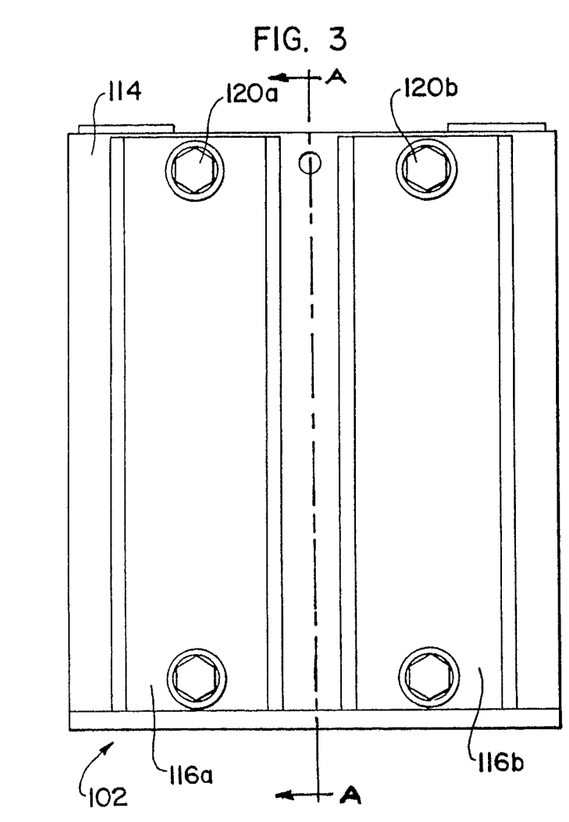
FIG. 3 is an end elevation view of one of the fuel cell stacks shown in the array of FIG. 2.

FIG. 3 also shows fuel cell stack 102 as including fluid manifold end plate 114, compression bars 116a, 116b, and fastening nuts 120a, 120b.

Figure 4:
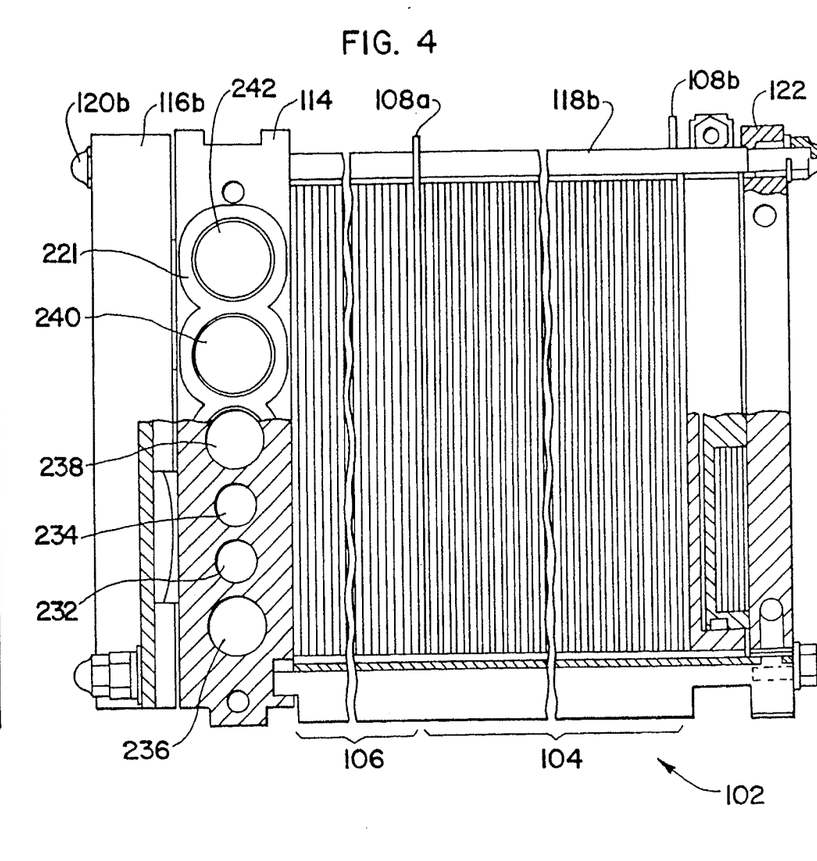
FIG. 4 is a side sectional view of the fuel cell stack taken in the direction of arrows A—A in FIG. 3.

In the sectional view of stack 102 shown in FIG. 4, fluid manifold end plate 114 has formed therein passages for containing the inlet fluid streams introduced to stack 102 and the other stacks in its array, as well as the outlet fluid streams exhausted from stack 102 and the other stacks in the array. The passages formed in fluid manifold end plate 114 for the inlet fluid streams are inlet fuel stream passage 232, inlet oxidant stream passage 236, and inlet coolant stream passage 240. The passages formed in fluid manifold end plate 114 for the outlet fluid streams are outlet fuel stream passage 234, outlet oxidant stream passage 238, and outlet coolant stream passage 242. A recess 221 is formed in fluid manifold end plate 114 for mounting and containing a sealing gasket, which surrounds each of the passages 232, 234, 236, 238, 240, 242, and fluidly isolates each of the passages from the environment surrounding stack 102.

Figure 5:
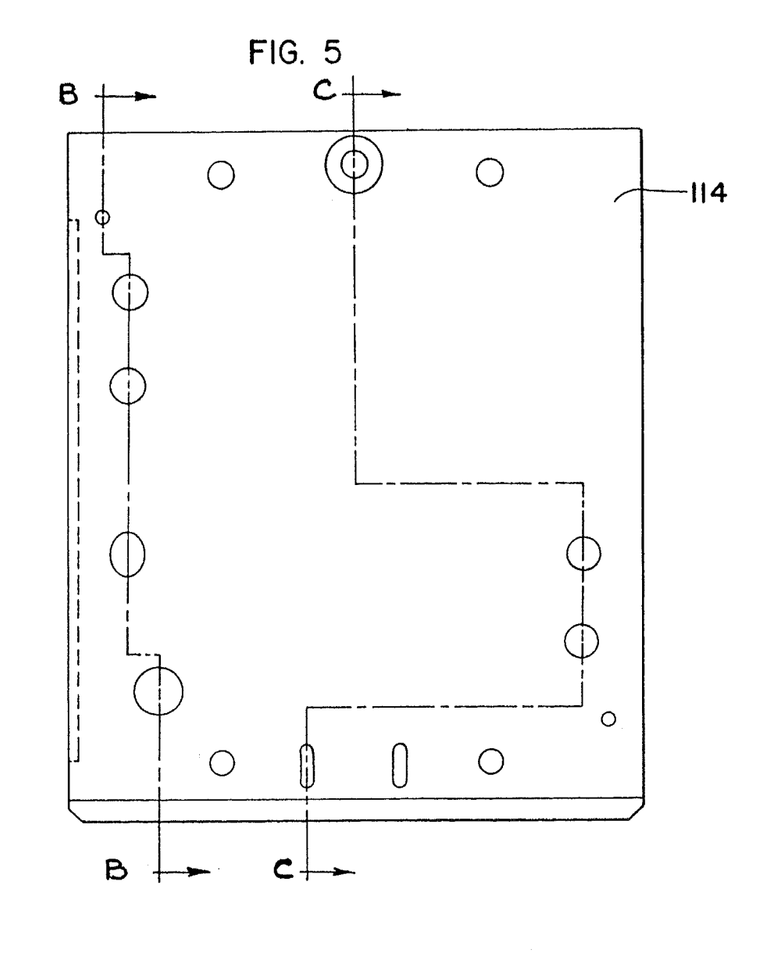
FIG. 5 is a end elevation view of the exterior surface of the fluid manifold end plate of the fuel cell stack shown in FIG. 4.
Figure 6:
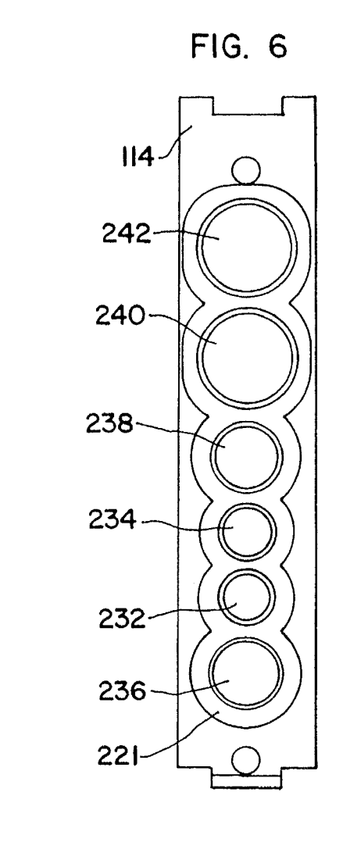
FIG. 6 is a side elevation view of the fluid manifold end plate shown in FIG. 5.
Figure 7:
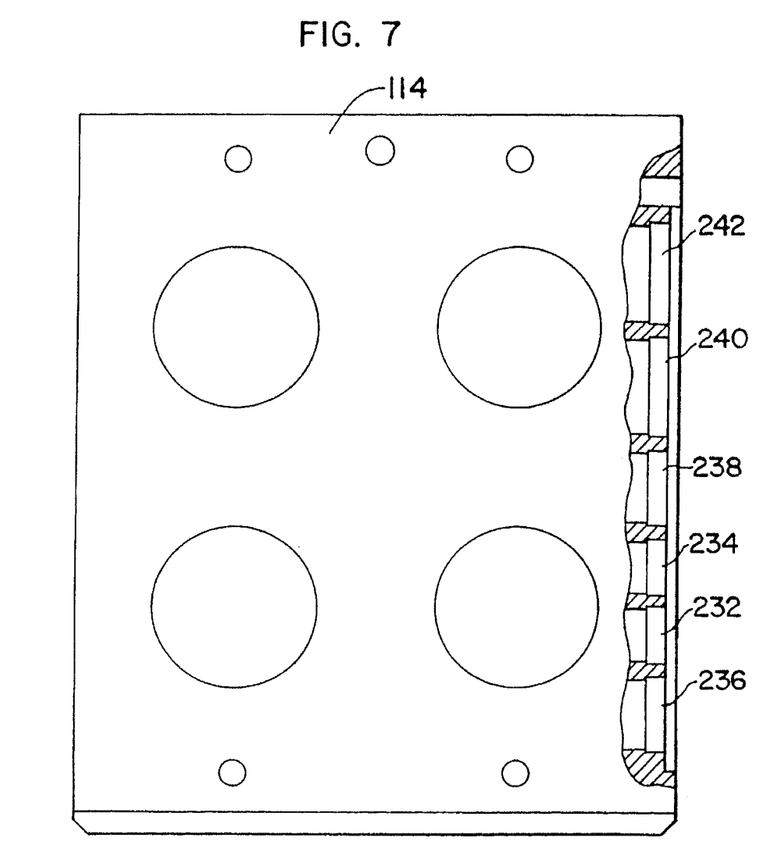
FIG. 7 is an end elevation view of the interior surface of the fluid manifold end plate of the fuel cell stack shown in FIG. 4.

The exterior surface of fluid manifold end plate 114, which faces away from the remainder of the stack, is shown in FIG. 5. FIG. 6 illustrates the location of the passages 232, 234, 236, 238, 240, 242 formed in fluid manifold end plate 114, as well as a gasket recess 221 surrounding each of the passages. FIG. 7 shows the interior surface of fluid manifold end plate 114, which faces toward the remainder of the stack.

Figure 8:
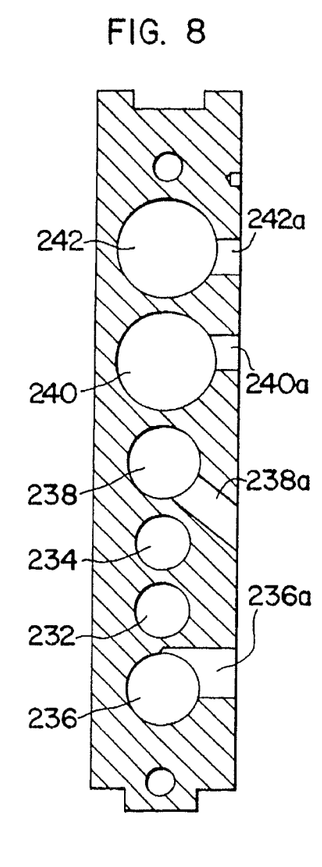
FIG. 8 is a side sectional view taken in the direction of arrows B—B in FIG. 5.

In the sectional view of fluid manifold end plate 114 shown in FIG. 8, inlet oxidant stream passage 236 includes a branch 236a for introducing the inlet oxidant stream to the inlet header feeding the cathodes of the stack (not shown in FIG. 8). Similarly, outlet oxidant stream passage 238 includes a branch 238a for receiving the outlet oxidant stream from the outlet header from the cathodes of the stack.

Figure 9:
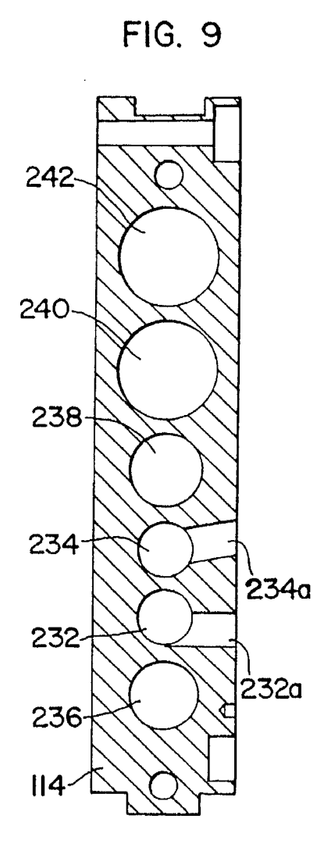
FIG. 9 is a side sectional view taken in the direction of arrows C—C in FIG. 5.

In the sectional view of fluid manifold end plate 114 shown in FIG. 9, inlet fuel stream passage 232 includes a branch 232a for introducing the inlet fuel stream to the inlet header feeding the anodes of the stack (not shown in FIG. 9). Similarly, outlet fuel stream passage 234 includes a branch 234a for receiving the outlet fuel stream from the outlet header from the anodes of the stack.

Figure 10:
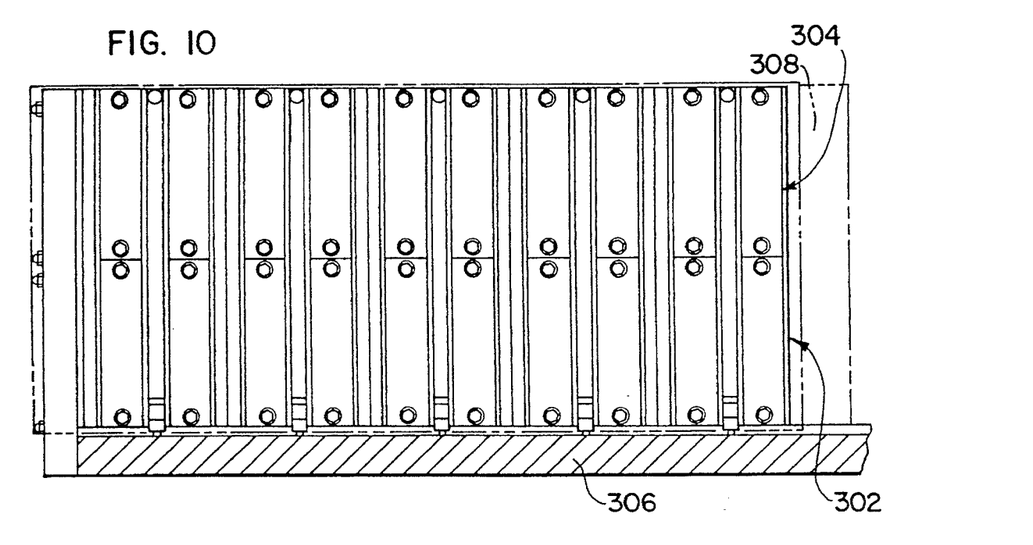
FIG. 10 is an end elevation view of two tiered arrays of fuel cell stacks with an internal fluid manifold assembly.
Figure 11:
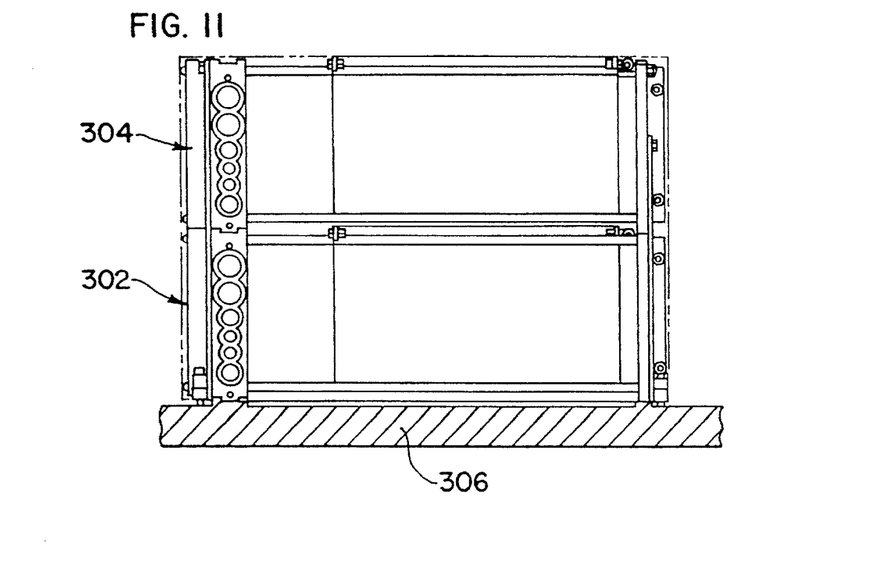
FIG. 11 is a side elevation view of the two tiered arrays of fuel cell stacks shown in FIG. 10.

FIG. 10 shows an arrangement of two tiered arrays 302, 304 of fuel cell stacks, each with an internal fluid manifold assembly. Arrays 302, 304 are mounted on a base 306. Numeral 308 in FIG. 10 designates the volume occupied by the inlet and outlet conduits which feed the inlet streams to each array and exhaust the outlet streams from each array. FIG. 11 shows the tongue-and-groove arrangement of the tiered arrays 302, 304 of FIG. 10. The tongue-and-groove arrangement maintains the alignment and structural stability of the fuel cell stack arrays.

Figure 12:
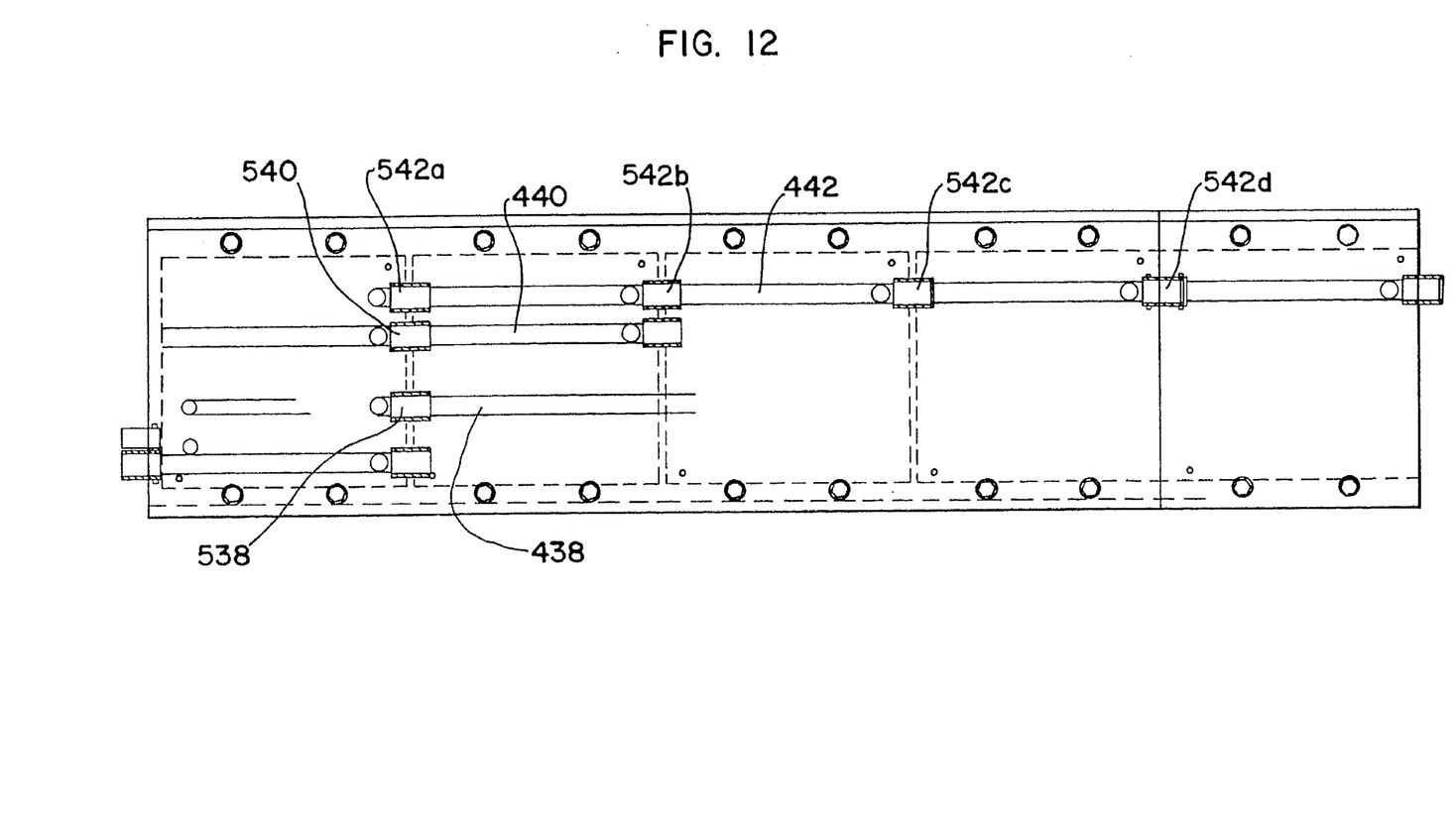
FIG. 12 is an end elevation view, partly in section, of a fluid manifold assembly for a fuel cell array, showing the connecting tubes located at the junction of each adjacent pair of fluid manifold end plates.

As an alternative to sealing gaskets disposed at the junction of adjacent fluid manifold end plates, connecting tubes can also be employed within the inlet and outlet passages. As shown in FIG. 12, connecting tubes located at the junction of each adjacent pair of fluid manifold end plates complete the fluid connection for each passage within the fluid manifold end plates which form the fluid manifold assembly of the fuel cell stack array. Connecting tubes 542a, 542b, 542c, 542d are disposed within and complete the fluid connection for passage 442. Similarly, connecting tubes 538, 540 are disposed in and complete the fluid connection for passages 438, 440, respectively.

Figure 13:
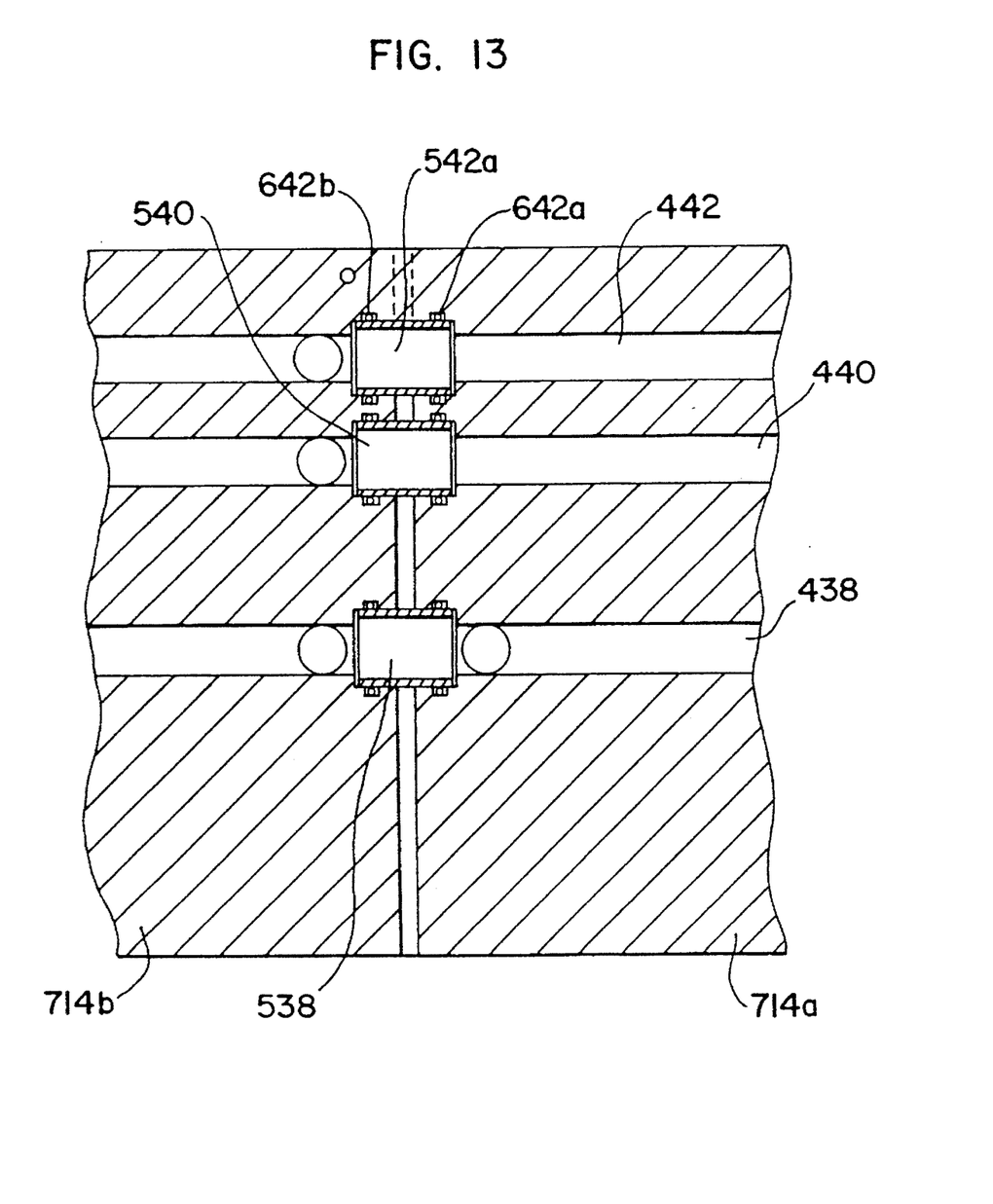
FIG. 13 is a sectional view showing the connecting tubes and associated resilient sealing rings located at the junction of each adjacent pair of fluid manifold end plates.

As shown in detail in FIG. 13, each connecting tube 538, 540, 542a has one or more resilient sealing rings disposed on its outer surface. For example, connecting tube 542a has a resilient sealing ring 642a disposed on its outer surface to form a substantially fluid impermeable seal between connecting tube 542a and fluid manifold end plate 714a. Similarly, connecting tube 542b has another resilient sealing ring 642b disposed on its outer surface to form a substantially fluid impermeable seal between connecting tube 542a and fluid manifold end plate 714b.

The components of the present fluid manifold assembly are preferably formed from a moldable, electrically insulating, and thermally insulating material, such as, for example, a thermoplastic or a thermoset material. The required properties for the material are chemical compatibility with the fuel cell inlet and outlet fluid stream constituents, as well as high performance characteristics such as, for example, high flexural strength, low creep, and low thermal expansion. A preferred material includes about 20% glass fibers, and has approximately the same thermal expansion coefficient as aluminum.

Forming the individual end plates of the fluid manifold from plastic material results in electrical and thermal isolation of the end plates. Electrical isolation is particularly problematic when coolant water flows through an electrically conductive plate, thereby creating the possibility of short circuits due to the conductivity of the water stream. The use of a thermally insulating plastic material in forming the end plates also avoids the heat losses sometimes associated with conventional stainless steel piping. In some conventional designs, the heat loss through the stainless steel piping was so substantial that temperature of the adjacent fuel cell stack was excessively depressed. The use of end plates formed of plastic material therefore promotes the active control of stack temperature by isolating the stack from the thermal conditions of the outside environment.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A fluid manifold assembly for an array comprising a plurality of electrochemical fuel cell stacks, said fluid manifold assembly comprising:

(a) a substantially fluid impermeable housing;

(b) means within said housing for introducing at least one inlet fluid stream to each of said fuel cell stacks;

(c) means within said housing for exhausting at least one outlet fluid stream from each of said fuel cell stacks.

2. The fluid manifold assembly of claim 1 wherein said introducing means comprises at least one inlet passage formed within said housing, each of said at least one inlet passage containing one of said at least one inlet fluid stream within said housing, and wherein said exhausting means comprises at least one outlet passage formed within said housing, each of said at least one outlet passage containing one of said at least one outlet fluid stream within said housing.

3. The fluid manifold assembly of claim 2 wherein said at least one inlet fluid stream comprises an inlet fuel stream and an inlet oxidant stream, said introducing means comprises two inlet passages, each of said two inlet passages containing one of said inlet fuel stream and said inlet oxidant stream, said at least one outlet fluid stream comprises an outlet fuel stream and an outlet oxidant stream, and said exhausting means comprises two outlet passages, each of said two outlet passages containing one of said outlet fuel stream and said outlet oxidant stream.

4. The fluid manifold assembly of claim 3 wherein said at least one inlet fluid stream further comprises an inlet coolant stream, said introducing means further comprises a third inlet passage, said third inlet passage containing said inlet coolant stream, said at least one outlet fluid stream further comprises an outlet coolant stream, and said exhausting means comprises a third outlet passage containing said outlet coolant stream.

5. The fluid manifold assembly of claim 2 wherein said housing comprises a plurality of plates, each of said plates attached to one of said plurality of fuel cell stacks.

6. The fluid manifold assembly of claim 5 wherein each of said plates is an end plate against which one of said plurality of fuel cell stacks is compressed.

7. The fluid manifold assembly of claim 5 wherein each of said at least one inlet passage and said at least one outlet passage has a connecting tube disposed therein at the junction of each adjacent pair of plates.

8. The fluid manifold assembly of claim 7 wherein said connecting tube has at least one resilient sealing ring disposed on the outer surface thereof.

9. The fluid manifold assembly of claim 5 wherein each of said plurality of plates has a tongue portion extending from one edge and a cooperating groove portion formed therein along the oppositely facing edge such that the tongue portion of each plate interlocks with the groove portion of an adjacent plate.

10. The fluid manifold assembly of claim 5 further comprising a sealing gasket disposed at the junction of each adjacent pair of plates, said sealing gasket surrounding at least a portion of each of said at least one inlet passage and said at least one outlet passage.

* * * * *